C. W. GRAHAM.
ART OF FORMING SOLDER EDGED CAPS.
APPLICATION FILED DEC. 13, 1906.
924,452.
Patented June 8, 1909.
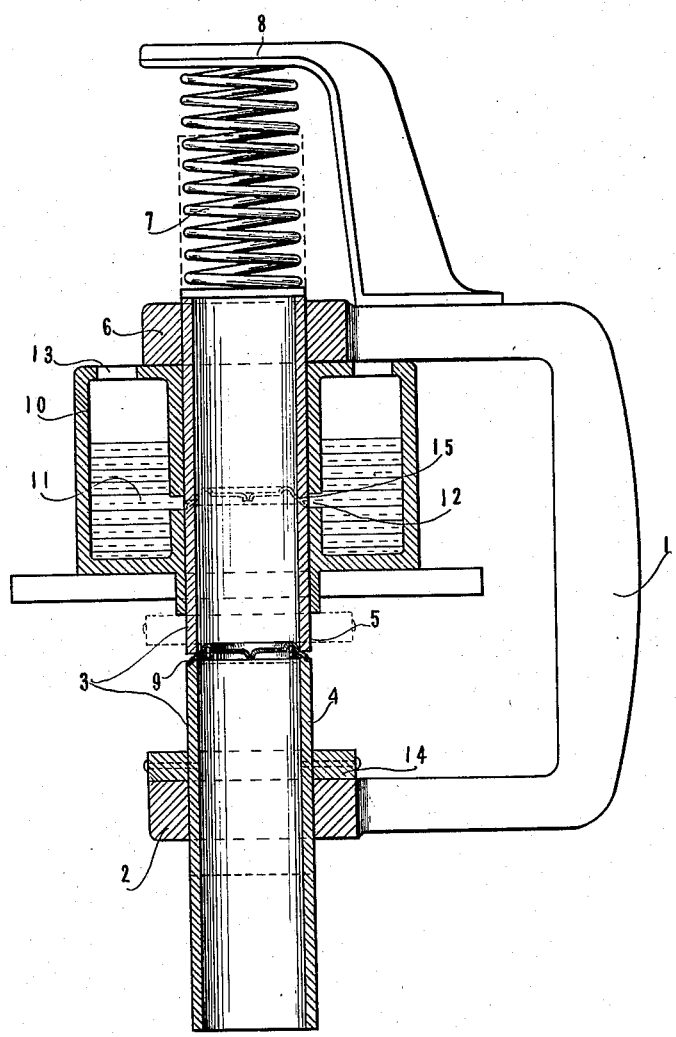
WITNESSES
INVENTOR
C. W. Graham
BY
Duell, Warfield & Duell
ATTORNEYS

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

ART OF FORMING SOLDER-EDGED CAPS.

No. 924,452.  Specification of Letters Patent.  Patented June 8, 1909.

Application filed December 13, 1906. Serial No. 347,591.

*To all whom it may concern:*

Be it known that I, CHARLES W. GRAHAM, residing at Rome, in the county of Oneida and State of New York, have invented certain new and useful Improvements in the Art of Forming Solder-Edged Caps, of which the following is a full, clear, and exact description, such as will enable others skilled in the art to which it appertains to make and use the same.

This invention relates to the art of applying solder or the like to metallic members.

One of the objects thereof is to provide a simple art for efficiently applying solder to can caps and the like.

Another object is to provide an art of the above nature adapted to position the solder at precisely the desired point for economical and efficient use.

Another object is to provide an art of the above type independent of all complicated apparatus and adapted to be carried on at a high rate of speed.

Other objects will be in part obvious and in part pointed out hereinafter.

The invention accordingly consists in the several steps and the relation and order of each of said steps with reference to one or more of the others thereof, as will be pointed out herein, and the scope of the application of which will be indicated in the following claims.

In order that certain of the features of this invention may be more readily grasped it may here be noted that in the art to which this invention relates it is of a high degree of importance that solder be economically used, inasmuch as it forms a considerable item in the cost of manufacture. In order to attain this economy it is essential that the solder be disposed in precisely the desired position, and that its amount be accurately gaged, thus doing away with waste and achieving uniformity in the resultant product. It may also be noted that it is highly important on account of the low selling price of the individual product that arts of this nature be adapted to be carried on at a high rate of speed.

The above and other advantageous features are attained in arts of the nature of that hereinafter described.

This invention proposes broadly an art or process in which a can cap or the like is dipped within molten solder in such manner as to bring the same into contact with the edges or other predetermined portions thereof and free from the chance of contacting at portions which it is desired should not be exposed thereto. The latter feature is preferably achieved by covering or otherwise protecting certain portions of the surface of the member prior to dipping, and maintaining said protecting means in operative position until the adhering solder has partially solidified. It is also proposed to confine the solder during its solidification in contact with the cap, and thus insure its proper disposition when solid.

In the accompanying drawing is shown a diagrammatic view of one of various possible types of apparatus by which my art may be carried on.

Referring to this drawing, there is shown a frame 1 having within a guide 2 a reciprocating plunger 3 comprising the members 4 and 5. Members 5, slidably mounted in a guide 6, is compressed, as by spring 7 interposed between guide 6 and an abutment 8 mounted upon frame 1, toward member 4, and is adapted to receive at its lower end a cap 9, preferably of substantially the form shown, although it is obvious that this invention comprehends the treatment of caps and similar articles of various types.

Mounted about the plunger 3 is an annular tank 10 containing molten solder 11 and provided with an annular port 12 leading to the plunger. This solder is kept in molten condition in any desired manner, and may be inserted as through the openings 13. Plunger 3 is movable within the guides 2 and 6 to raise the cap to a point opposite the port 12, this movement being limited as by a collar 14 secured to the member 4.

The method of use of this apparatus in carrying on my art is substantially as follows: The members 4 and 5 are sprung apart to permit the insertion of the cap 9, whereupon the same is clamped thereby and the upper and lower surfaces in large part protected by these members. It may here be noted that by the term "protected" as used throughout this description and in the following claims is denoted a state wherein the described surfaces are in any manner withheld from contact with the solder, whether by a member forced thereon or by a coating, or otherwise. The plunger 3 is then raised to the limit of its motion permitted by collar 14, whereupon the cap is brought within the molten solder and the same flows within the small annular space 15 about the edges of the cap. The central portion of the upper surface of the cap is protected by member 5, and the central portion, as well as the entire area of the lower surface, is protected by member 4. It may here be noted that by the term "central portion" is meant a portion of the surface other than the edges, whether the article be circular as shown or of any other conformation. It may also be noted at this point that the term "dipping" is used throughout to designate that manipulation of a member which comprises submerging the same within a liquid whereby the liquid is permitted to flow into contact with the surface or portions of the surface thereof. The cap 9 is then lowered and the solder within the recess 15 permitted to partially congeal while confined by the inner walls of the tank 10, and as the plunger reaches its lowermost position the cap may be removed by springing apart the members 4 and 5.

It will thus be seen that I have provided an art in which the above-enumerated objects are achieved and the advantages herein set forth are among others present. The entire manipulation is simple, the consumption of materials economical, and the results efficient and uniform.

As the art above described could be carried on by the use of radially different apparatus, and as many variations from the details of the art herein set forth could be incorporated without deviation from the broad principles of my invention, I desire that all matter herein set forth or shown in the accompanying drawing shall be interpreted as illustrative and not in a limiting sense.

Having described my invention, what I claim as new and desire to secure by Letters Patent is:—

1. The art which comprises protecting the central portion of one surface of a cap and protecting the other surface in its entirety, dipping the cap in molten solder, withdrawing said cap and permitting the solder withdrawn therewith to congeal, and removing the protecting means.

2. The art which comprises protecting the central portion of the upper surface of a cap and the entire lower surface thereof, dipping the unprotected portion of the cap in molten solder, withdrawing said cap and permitting the solder withdrawn therewith to congeal, and removing the protecting means.

3. The art which comprises dipping a cap in molten solder, withdrawing the cap and confining a portion of said solder against said cap, permitting the confined portion of said solder to congeal, and releasing said cap.

4. The art which comprises dipping a cap in molten solder, withdrawing said cap and confining the solder withdrawn therewith against said cap, permitting said confined solder to congeal, and releasing said cap.

5. The art which comprises dipping the edges of a cap in molten solder, withdrawing said cap and confining the solder withdrawn therewith against the edges of said cap, permitting the confined solder to congeal, and releasing the cap.

6. The art which comprises dipping a cap in molten solder, withdrawing said cap and confining the solder withdrawn therewith substantially within the contour of said cap and against the edges thereof, permitting said confined solder to congeal, and releasing said cap.

7. The art which comprises protecting the central portion of the upper surface of a cap, dipping the unprotected portions of said cap in molten solder, withdrawing said cap and confining the solder withdrawn therewith against the edges of said cap, permitting said confined solder to congeal, and removing the protecting means and releasing said cap.

8. The art which comprises protecting portions of the upper and lower surfaces of a cap, dipping the unprotected portions of said cap in molten solder, withdrawing said cap, confining the solder withdrawn therewith against the edges of said cap, permitting said confined solder to congeal, removing the protecting means, and releasing said cap.

9. The art which comprises protecting the central portion of one of the surfaces of a cap and the entire opposite surface thereof, dipping said protected cap in molten solder, withdrawing said cap and confining the solder withdrawn therewith against the edges of said cap, permitting said confined solder to congeal, and removing the protecting means and releasing said cap.

In testimony whereof I affix my signature, in the presence of two witnesses.

CHARLES W. GRAHAM.

Witnesses:
F. B. BEERS,
F. T. KENT.